United States Patent
Skog

(10) Patent No.: US 9,967,738 B2
(45) Date of Patent: *May 8, 2018

(54) METHODS AND ARRANGEMENTS FOR ENABLING DATA TRANSMISSION BETWEEN A MOBILE DEVICE AND A STATIC DESTINATION ADDRESS

(71) Applicant: Telefonaktiebolaget L M Ericsson (publ), Stockholm (SE)

(72) Inventor: Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 108 days.

This patent is subject to a terminal disclaimer.

(21) Appl. No.: 15/003,379

(22) Filed: Jan. 21, 2016

(65) Prior Publication Data

US 2016/0157094 A1    Jun. 2, 2016

Related U.S. Application Data

(63) Continuation of application No. 13/989,118, filed as application No. PCT/SE2010/051297 on Nov. 24, 2010, now Pat. No. 9,246,872.

(51) Int. Cl.
*H04L 29/12* (2006.01)
*H04L 12/66* (2006.01)
(Continued)

(52) U.S. Cl.
CPC ........... *H04W 8/26* (2013.01); *H04L 12/4625* (2013.01); *H04L 12/4675* (2013.01);
(Continued)

(58) Field of Classification Search
CPC . H04L 12/4526; H04L 12/4675; H04L 12/66; H04L 29/12896; H04L 45/72;
(Continued)

(56) References Cited

U.S. PATENT DOCUMENTS

| 6,862,286 B1 | 3/2005 | Tams et al. |
| 7,372,868 B2 | 5/2008 | Corwin .................. 370/463 |

(Continued)

FOREIGN PATENT DOCUMENTS

| EP | 1718033 A1 | 11/2006 |
| WO | 9913486 A2 | 3/1999 |

(Continued)

OTHER PUBLICATIONS

Extended European Search Report dated Dec. 8, 2015 in EP Application No. 10860068.5, 7 pages.

*Primary Examiner* — Alina A Boutah
(74) *Attorney, Agent, or Firm* — Rothwell, Figg, Ernst & Manbeck, P.C.

(57) ABSTRACT

A solution for simplifying data transmission between a mobile device (MD) and a destination address (DA). In some embodiments, the solution includes a connector, associated with a gateway, that has access to a first mapping between a subscriber identity (SI) associated with the MD and a DA to which the data from the MD should be sent. The gateway is configured to send a second mapping between a temporary IP address of the MD and the SI associated with the MD to the connector. When the gateway receives data from the temporary IP address of the MD, the gateway requests information of the address to which the GGSN should route that data. Since, the connector can identify from which IP address the data is received, the connector can then retrieve the address by using the first mapping and the second mapping.

23 Claims, 8 Drawing Sheets

(51) Int. Cl.
*H04W 8/26* (2009.01)
*H04L 12/46* (2006.01)
*H04W 4/00* (2018.01)
*H04L 12/721* (2013.01)

(52) U.S. Cl.
CPC ........ *H04L 12/66* (2013.01); *H04L 29/12896* (2013.01); *H04L 45/72* (2013.01); *H04L 61/106* (2013.01); *H04L 61/2007* (2013.01); *H04L 61/605* (2013.01); *H04W 4/005* (2013.01)

(58) Field of Classification Search
CPC . H04L 61/106; H04L 61/2007; H04L 61/605; H04W 4/005; H04W 8/28
USPC ........ 370/328, 401, 437, 466; 709/226, 222, 709/223, 225; 718/1
See application file for complete search history.

(56) References Cited

U.S. PATENT DOCUMENTS

| | | | | |
|---|---|---|---|---|
| 8,886,183 | B2* | 11/2014 | Lindholm | H04W 8/26 455/432.1 |
| 2002/0105955 | A1 | 8/2002 | Roberts et al. | 370/401 |
| 2003/0016679 | A1 | 1/2003 | Adams et al. | 370/401 |
| 2003/0129974 | A1 | 7/2003 | Viitala | 455/414 |
| 2003/0152042 | A1 | 8/2003 | Soininen et al. | 370/310 |
| 2003/0204617 | A1 | 10/2003 | Buchsbaum et al. | 709/236 |
| 2004/0196858 | A1 | 10/2004 | Tsai et al. | 370/401 |
| 2005/0243837 | A1 | 11/2005 | Boyd et al. | 370/395.52 |
| 2006/0080380 | A1 | 4/2006 | Aizu et al. | 709/203 |
| 2006/0276226 | A1 | 12/2006 | Jiang | 455/558 |
| 2007/0014301 | A1 | 1/2007 | Miller et al. | 370/401 |
| 2007/0019657 | A1 | 1/2007 | Takayama | 370/401 |
| 2007/0041355 | A1 | 2/2007 | Shaw | 370/351 |
| 2007/0171856 | A1 | 7/2007 | Bruce et al. | 370/328 |
| 2008/0019387 | A1 | 1/2008 | Kim et al. | 370/401 |
| 2008/0031257 | A1 | 2/2008 | He | 370/395.31 |
| 2008/0062891 | A1 | 3/2008 | Van der Merwe et al. | 370/254 |
| 2008/0153521 | A1* | 6/2008 | Benaouda | G01D 4/004 455/466 |
| 2008/0263137 | A1 | 10/2008 | Pattison et al. | 709/203 |
| 2009/0049202 | A1 | 2/2009 | Pattison et al. | 709/249 |
| 2009/0061860 | A1 | 3/2009 | Jiang | 455/433 |
| 2009/0285227 | A1 | 11/2009 | De Groote et al. | 370/401 |
| 2009/0323636 | A1 | 12/2009 | Dillon et al. | 370/331 |
| 2010/0223378 | A1 | 9/2010 | Wei | 709/224 |
| 2011/0128911 | A1* | 6/2011 | Shaheen | H04L 63/104 370/328 |
| 2011/0134769 | A1 | 6/2011 | Lee et al. | 370/252 |
| 2011/0161503 | A1* | 6/2011 | Krebs | H04W 4/00 709/227 |
| 2011/0268047 | A1* | 11/2011 | Nath | H04W 4/005 370/329 |
| 2012/0214520 | A1* | 8/2012 | Bergqvist | H04W 68/02 455/458 |
| 2012/0220326 | A1* | 8/2012 | Li | H04W 4/005 455/509 |
| 2012/0302229 | A1* | 11/2012 | Ronneke | H04L 29/12754 455/422.1 |

FOREIGN PATENT DOCUMENTS

| | | |
|---|---|---|
| WO | 03065152 A2 | 8/2003 |
| WO | 2007008698 A2 | 1/2007 |
| WO | 2008102013 A2 | 8/2008 |

* cited by examiner

METHODS AND ARRANGEMENTS FOR ENABLING DATA TRANSMISSION BETWEEN A MOBILE DEVICE AND A STATIC DESTINATION ADDRESS

CROSS REFERENCE TO RELATED APPLICATIONS

This application is a continuation of U.S. patent application Ser. No. 13/989,118 (published as US 20130238816), which is a 35 U.S.C. § 371 National Phase Entry Application from PCT/SE2010/051297, filed Nov. 24, 2010, and designating the United States. The above identified applications and publication are incorporated by reference.

TECHNICAL FIELD

The embodiments of the present invention relates to methods and arrangements for enabling data transmission between a mobile device and a static destination address, and in particular to a simplified procedure for finding the static destination address.

BACKGROUND

Cloud computing is Internet-based computing, whereby shared resources, software, and information are provided to computers and other devices on demand, like the electricity grid. FIG. 1 illustrates one example of a cloud 10 where several computers 20 share different resources 30.

Cloud computing is a paradigm shift following the shift from mainframe to client—server in the early 1980s. Details are abstracted from the users, who no longer have need for expertise in, or control over, the technology infrastructure "in the cloud" that supports them. Cloud computing describes a new supplement, consumption, and delivery model for IT services based on the Internet, and it typically involves over-the-Internet provision of dynamically scalable and often virtualized resources.

Cloud computing is a model for enabling convenient, on-demand network access to a shared pool of configurable computing resources e.g., networks, servers, storage, applications, and services that can be rapidly provisioned and released with minimal management effort or service provider interaction.

"Cloud computing" is based on virtualization, which is a method of partitioning one physical server computer into multiple "virtual" servers, giving each the appearance and capabilities of running on its own dedicated machine.

To achieve a higher degree of security and control of the virtual resources the concept of "virtual private cloud" has been introduced. A Virtual Private Cloud (VPC) is a private cloud existing within a shared or public cloud.

To set-up a VPN connection from a mobile operator to any existing enterprise network or a "cloud" takes time and is costly. A specific Access Point Name (APN) in the mobile devices is required, and it is also needed to configure the VPN between an operator and an enterprises. An operator gateway uses the APN for selecting which network to connect to. As an example, machine-to-machine (M2M) devices will connect to the enterprise network via a specific APN. This is illustrated in FIG. 2, where Machine-to-Machine (M2M) devices 115 of a 3G network 100 establish Virtual Private Network (VPN) connections 135 with which they can connect Local Area Networks (LAN) 160 of different enterprise networks 150. The M2M devices 110 are connected to the Internet via a gateway 120 referred to as a GPRS Gateway Support Node (GGSN) in accordance with the Access Point Name (APN) 115 of the M2M device 110. As stated the VPN connections 135 are established with which the M2M device can connect to the LAN of the respective enterprise networks 150. The M2M devices can then interact with M2M applications 140 as they are located on the LAN 160.

There are basically two ways a VPN can be set-up between a device and an enterprise Local Area Network (LAN):

(1) A mobile device has been configured with an APN which points to the enterprise. An operator gateway, such as a GPRS Gateway Support Node, GGSN, will use this information to set-up a connection between the operator gateway and the enterprise. To do this, the operator gateway needs to exchange VPN parameters before the connection can be established. Examples of such parameters are address to an enterprise Dynamic Host Configuration Protocol (DHCP) server, Radius Server, VPN Gateway, and VPN credentials to encrypt and authenticate. The GGSN needs to be configured with this. The configuration and the parameter exchange are often manual work which takes time and is therefore costly.

(2) A mobile device uses an APN which points to the Internet as the network to connect to. This is used for mobile devices that would like to reach internet and surf. No special behavior regarding provisioning of APN is needed. However, it is required to provision VPN parameters in the mobile device and the provisioning to mobile devices is "costly". Also the capacity demand on the mobile device increases when it has to encrypt/decrypt IP-packages and therefore a better Central Processing Unit (CPU) is required which increases the cost. In addition, since the CPU has to work harder due to the encryption/decryption, the CPU also drains the battery faster.

SUMMARY

The object of the embodiments of the present invention is to provide a solution for simplifying data transmission between a mobile device and a static destination address.

This is achieved by introducing a network node referred to as a VPC connector. The VPC connector is associated with a gateway of the operator network such as a GGSN. The VPC connector has access to a static first mapping between a subscriber identity associated with the mobile device and a static destination address to which data from the mobile device should be sent. The subscriber identity is stored on the SIM card inserted in the mobile device. The subscriber identity may be the MSISDN or the IMSI and the static destination address may be a VPC address. In order for the gateway to be able to route data from the mobile device to the correct static destination address, the gateway sends a dynamic second mapping between a temporary IP (Internet Protocol) address of the mobile device and the subscriber identity associated with the mobile device to the VPC connector.

When the gateway receives data from the IP address of the mobile device, the gateway requests information of the static destination address to which the GGSN should route that data. Since, the VPC connector can identify from which temporary IP address the data is received, the VPC connector can then retrieve the static destination address by using the static first mapping and the dynamic second mapping.

According to a first aspect of embodiments of the present invention, a method in a network node of an operator network for enabling data transmission between a mobile device and a static destination address is provided. The network node has access to a static first mapping between a subscriber identity associated with the mobile device and the static destination address to which the data from the mobile device should be sent. In the method, a gateway is provided with the static destination address to which the data from the mobile device should be sent, by using a dynamic second mapping between the subscriber identity associated with the mobile device and a temporary IP address of the mobile device and said first mapping such that the gateway can direct the data to the provided static destination address. The data is identified to be received from the temporary IP-address of the mobile device.

According to a second aspect of embodiments of the present invention, a network node for enabling data transmission between a mobile device and a static destination address is provided. The network node has access to a static first mapping between a subscriber identity associated with the mobile device and the static destination address to which the data from the mobile device should be sent. The network node comprises a provisioning unit configured to provide a gateway with the static destination address to which the data from the mobile device should be sent, by using a dynamic second mapping between the subscriber identity associated with the mobile device and a temporary IP address of the mobile device and said first mapping such that the gateway can direct the data to the provided static destination address. The data is identified to be received from the temporary IP-address of the mobile device.

According to a third aspect of embodiments of the present invention a method in a gateway of an operator network for enabling data transmission between a mobile device and a static destination address is provided. A network node associated with the gateway has access to a static first mapping between a subscriber identity associated with the mobile device and the static destination address to which the data from the mobile device should be sent. In the method, the static destination address to which the data from the mobile device should be sent is obtained from the network node, by using a dynamic second mapping between the subscriber identity associated with the mobile device and a temporary IP address of the mobile device and said first mapping enabling the gateway to direct the data to the provided static destination address, wherein the data is identified to be received from the temporary IP-address of the mobile device. In addition, data from the mobile device is directed to the received static destination address.

According to a fourth aspect of embodiments of the present invention, a gateway of an operator network for enabling data transmission between a mobile device and a static destination address is provided. A network node associated with the gateway has access to a static first mapping between a subscriber identity associated with the mobile device and the static destination address to which the data from the mobile device should be sent. The gateway comprises a receiver/transmitter unit configured to obtain the static destination address to which the data from the mobile device should be sent, by using a dynamic second mapping between the subscriber identity associated with the mobile device and a temporary IP address of the mobile device and said first mapping enabling the gateway to direct data, identified to be received from the temporary IP-address of the mobile device, to the provided static destination address. The gateway further comprises a router configured to direct the data from the mobile device to the received static destination address.

An advantage with embodiments of the present invention, is that the mobile operator can offer an execution platform appearing as a cloud for an enterprise customer that uses e.g. 3GPP radio access to reach the applications without the requirement to provision a specific APN or password in the M2M Device. According to embodiments of the present invention, the existing SIM-authentication can be re-used to find the correct static destination address for a specific M2M Device. Further, it is assumed that the operator domain is secure for sending packets within the network. This results in that the operators can save time and money, since no further authentication has to be performed and further configuration and parameter exchange can be avoided.

A further advantage with embodiments of the present invention is that the solution is protocol agnostic.

A yet further advantage with embodiments of the present invention is that the mobile devices can be provided with dynamic addresses, also referred to as temporary addresses.

DETAILED DESCRIPTION

Figure 1:
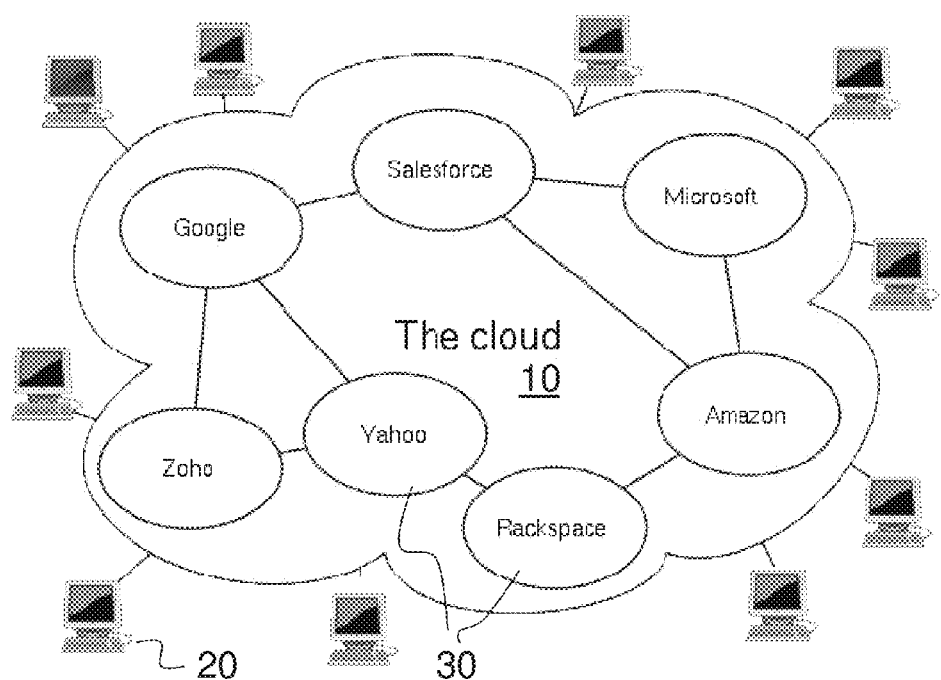
FIG. 1 illustrates one example of a cloud where several computers share different resources according to prior art.
Figure 2:
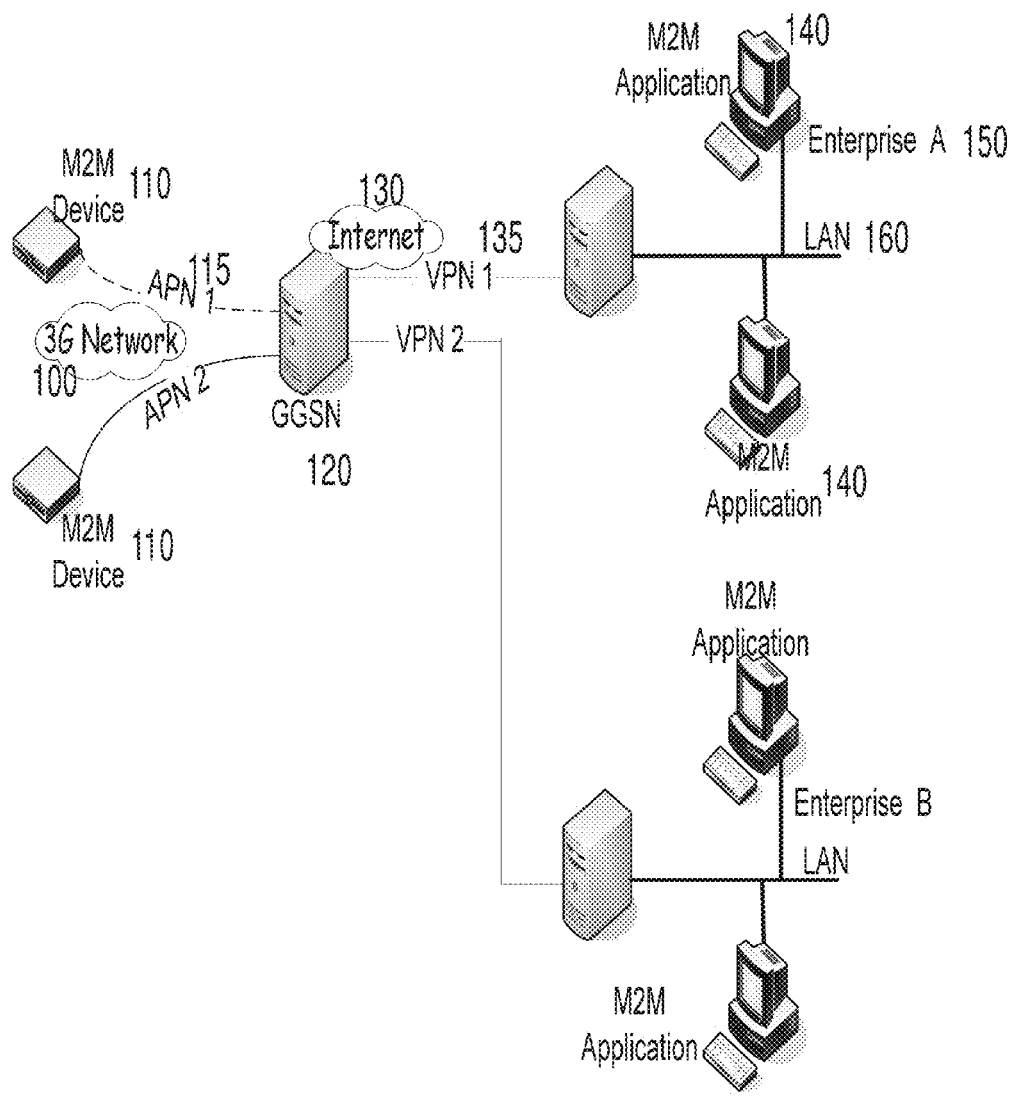
FIG. 2 illustrates VPN connections between M2M devices and M2M applications in enterprise networks according to prior art.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

The embodiments of the present invention relate to methods and arrangements for enabling data transmission between a mobile device and a static destination address. This is achieved by introducing a network node and to re-use the existing SIM-authentication to find a static destination address to which the data from the mobile device should be sent.

In this specification, the mobile device is exemplified by a M2M device, such as a coffee machine or a refrigerator which can interact with an application at the service provider in an enterprise network. The connection to the application, e.g. a VPN connection, is provided over a wireless network such as a 2G, 3G or 4G network. Accordingly, the connection between the M2M device and M2M Application where the M2M Application can be executed in a "cloud environment" may be a VPN connection, but additional encryption for the connection is not required since the SIM-authentication is performed which imply a secure connection. If any additional encryption should be used such an encryption can be done on the application level.

Furthermore, each mobile device has a Subscriber Identity Module (SIM) card which is associated with a static destination address, i.e. the address of the application at the service provider in the enterprise network to which the mobile device should connect. Hence, for example, a coffee machine comprising a SIM card can connect to an application in the network of coffee provider.

When the coffee machine and the application interact, the coffee provider can monitor the condition of the coffee machine and detect when e.g. more coffee must be provided or when maintenance is required.

In order to simplify the procedure to set up a connection, the operators' Subscriber Identity Module (SIM)-authentication is re-used to find the address to which data packets from a mobile device should be routed and to which the mobile device should establish the connection. The SIM comprises subscriber information e.g. different keys used for authentication and different subscriber identities such as IMSI and the SIM is issued and controlled by the operator. The SIM-card may either be a physical SIM-card or an equivalent SIM function based on software, i.e. no physical card. As stated above, the SIM of e.g. an M2M device is also associated with the static destination to which the data from the M2M device should be sent.

The simplified procedure is achieved by introducing a network node referred to as a Virtual Private Cloud (VPC) connector which is a part of the operator domain. Based on information retrieved from the conventional SIM-authentication, the VPC connector can identify the address to which data packets from a mobile device should be routed.

Figure 3:
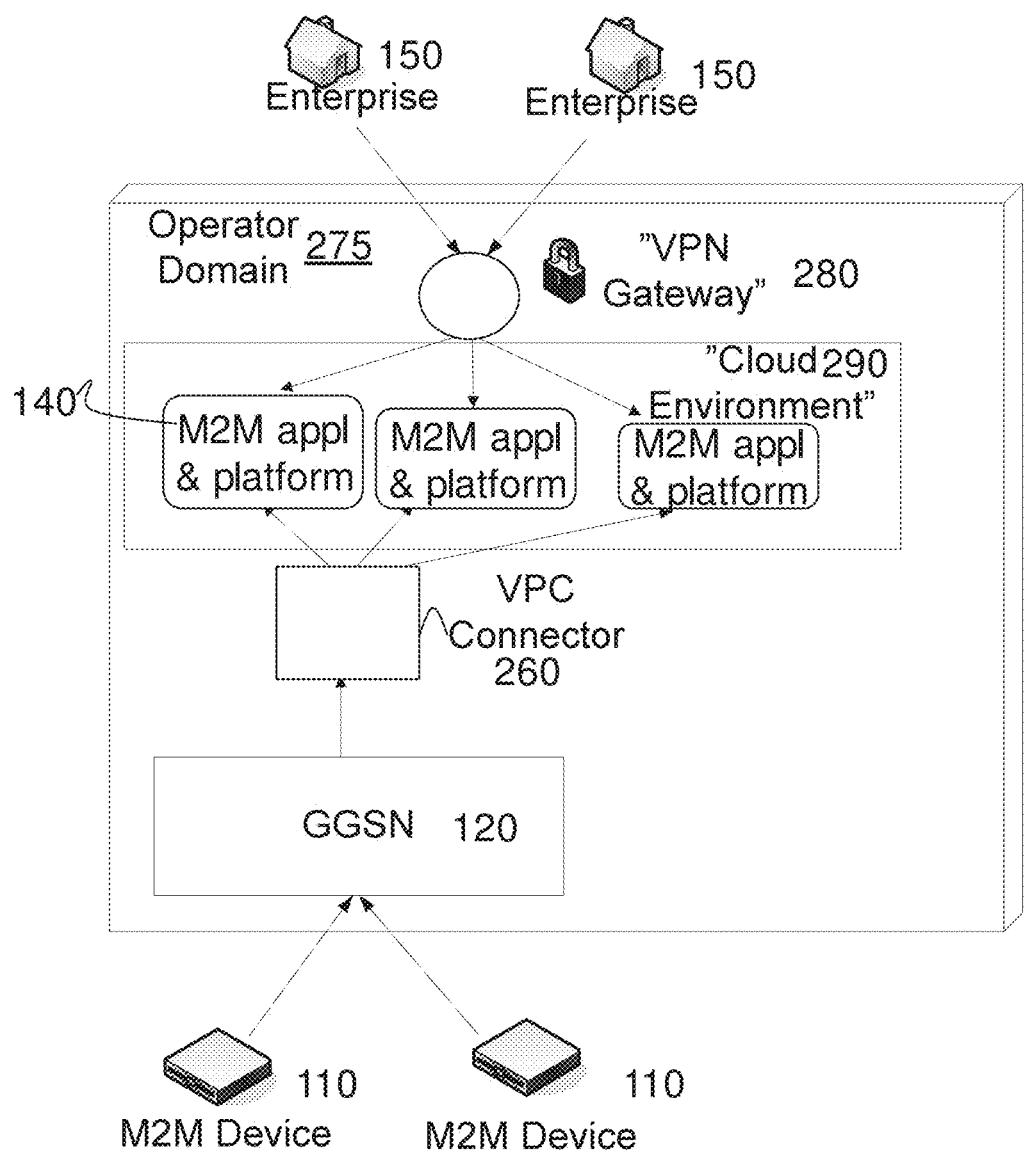
FIG. 3 illustrates a VPC connector in an operator domain according to embodiments of the present invention.

The VPC connector is shown in FIG. 3, where it is illustrated that the VPC connector 260 is connected between a gateway 120 of the operator network 275 and the cloud environment 290. The network is in this specification exemplified by a mobile network (e.g. a 2G, 3G or 4G network), wherein the mobile devices 110 (exemplified by M2M devices) are wirelessly connected to the gateway 120 of the network via base stations (not shown). According to embodiments of the present invention, the VPC connector 260 is configured to store a static first mapping between the each subscriber identity of the mobile devices and the static destination address 140 that the data from the respective mobile device should be sent to. The enterprises 150 can access their own cloud environment 290 via a VPN gateway 280 in this example.

Figure 4:
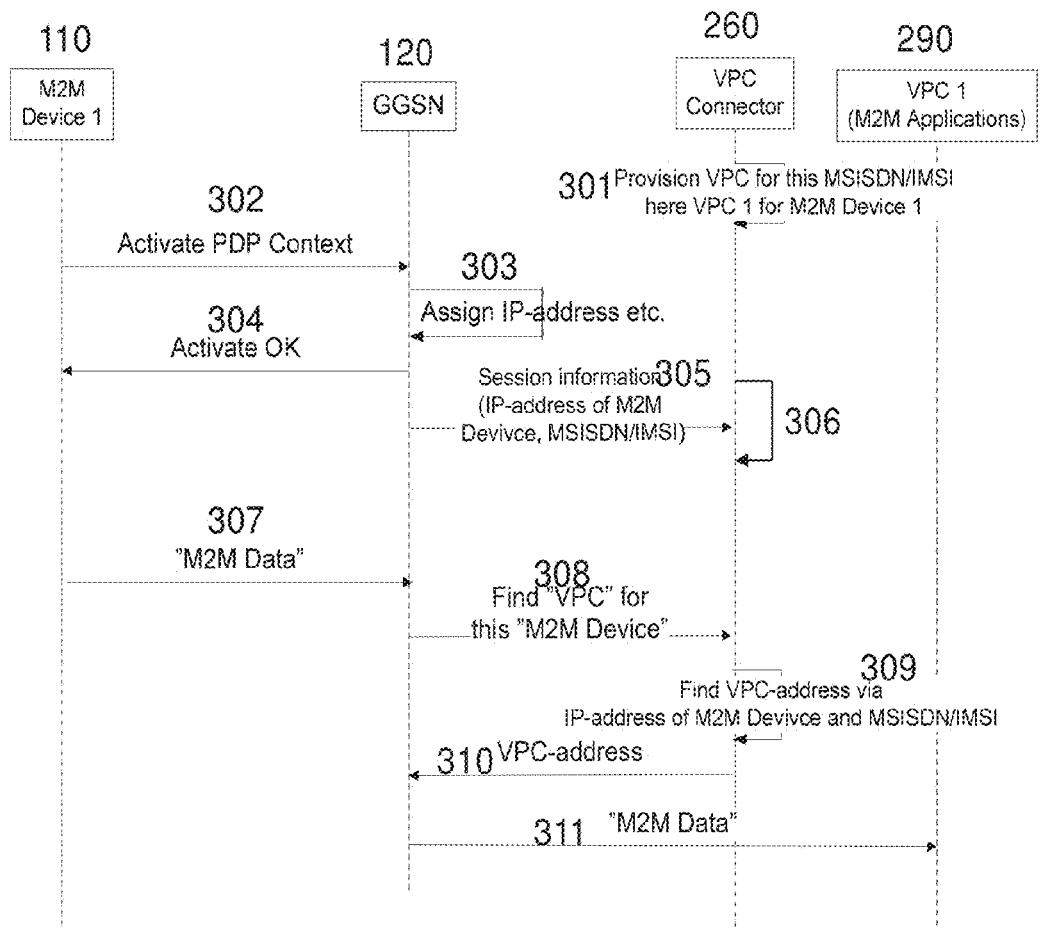
FIGS. 4-5 are sequence diagrams of the method according to embodiments of the present invention.
Figure 5:
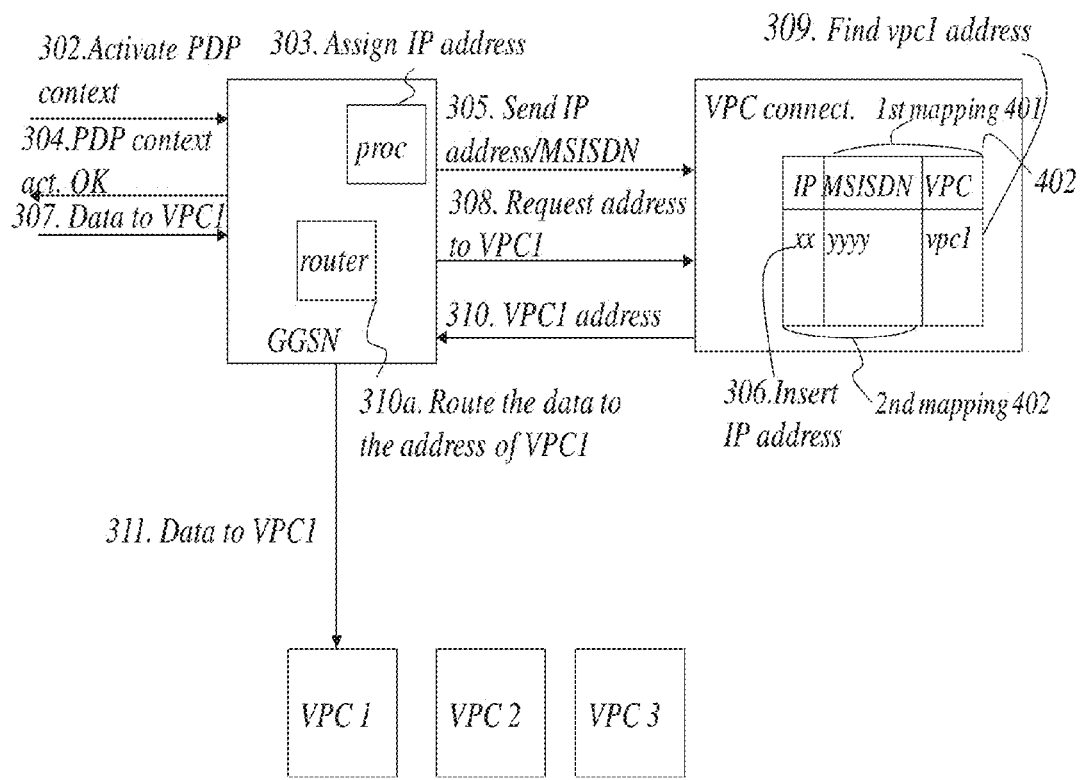

Referring now to a scenario illustrated in FIGS. 4 and 5, where a VPC connector 260 is provided 301 with a static first mapping 401 between a subscriber identity and a static destination to which data from the subscriber of the subscriber identity should be sent. The subscriber identity is available on the SIM card of the subscriber.

As illustrated in the sequence diagrams of FIGS. 4 and 5, a mobile device exemplified as an M2M device 110 establishes an initial data connection with the network via the gateway, exemplified as a Gateway GPRS Support Node (GGSN) 120 by using an activate PDP context procedure 302. During the PDP context activation procedure 302, the mobile device is authenticated to the operator network by using information stored on the SIM card e.g. in accordance with conventional methods. The mobile device is also assigned 303 a temporary IP address to be used for IP communication. A confirmation that the PDP context activation procedure is properly set up is sent 304 by the gateway to the mobile device.

When the temporary IP addressed is assigned to the mobile device and the confirmation is sent, the gateway sends 305 session information to the VPC connector 260. The session information comprises the assigned IP addressed associated with the subscriber identity of the SIM of the mobile device. Thus, the VPC connector stores 306 a dynamic second mapping 402 between the temporary IP address and the subscriber identity, wherein the subscriber identity is the same type of subscriber identity used in the static first mapping. By means of the subscriber identity in the second mapping, a table comprising an association between the temporary IP address, the subscriber identity and the static destination address is stored in the VPC connector. In this way, the VPC connector has an association between the temporary IP address and the static destination address. It should be noted that the temporary IP address will be replaced with another temporary IP address when the mobile device disconnects and connects again. The table is shown in FIG. 5.

Now, the mobile device has an established IP connection with the network and the mobile device can start sending 307 data to its application. When the gateway of the network receives data from the mobile device, the gateway receives also information of the IP-address from which the data origins. Then, the gateway sends 308 a request to the VPC connector to find the static destination address for the mobile device. In the request, the gateway includes the IP address from which the data origins. Accordingly, the VPC connector is configured to investigate 309 the table to find the static destination address based on the IP address. When the VPC connector has found the static destination address, it transmits 310 the static destination address to the gateway. Now the gateway knows to which static destination address it should route the data packets, which implies that data packets can be sent 311 to the static destination address.

It should be noted that when the mobile device deactivates the PDP context i.e. removes the connection, the temporary IP-address in the second mapping will be set to "zero" while the static first mapping will still be the same as before.

As mentioned above, the mobile device may be an M2M device communicating with an application of an enterprise in a virtual private cloud (VPC), i.e. the application is a part of the cloud. Therefore in such a scenario, the static destination address is a static VPC address.

Further, examples of subscriber identity types that may be used are International Mobile Subscriber Identity (IMSI) and Mobile Subscriber Integrated Services Digital Network Number (MSISDN). It is however required that the same type of subscriber identity is used for the first and the second mapping. It should be noted that the gateway may comprise a memory to store the second mapping which would result in that the number requests to the VPC connector can be avoided.

By using the embodiments of the present invention, the procedure for establishing a connection between an M2M device and its static VPC address is simplified, since no additional authentication is required.

Figure 6:
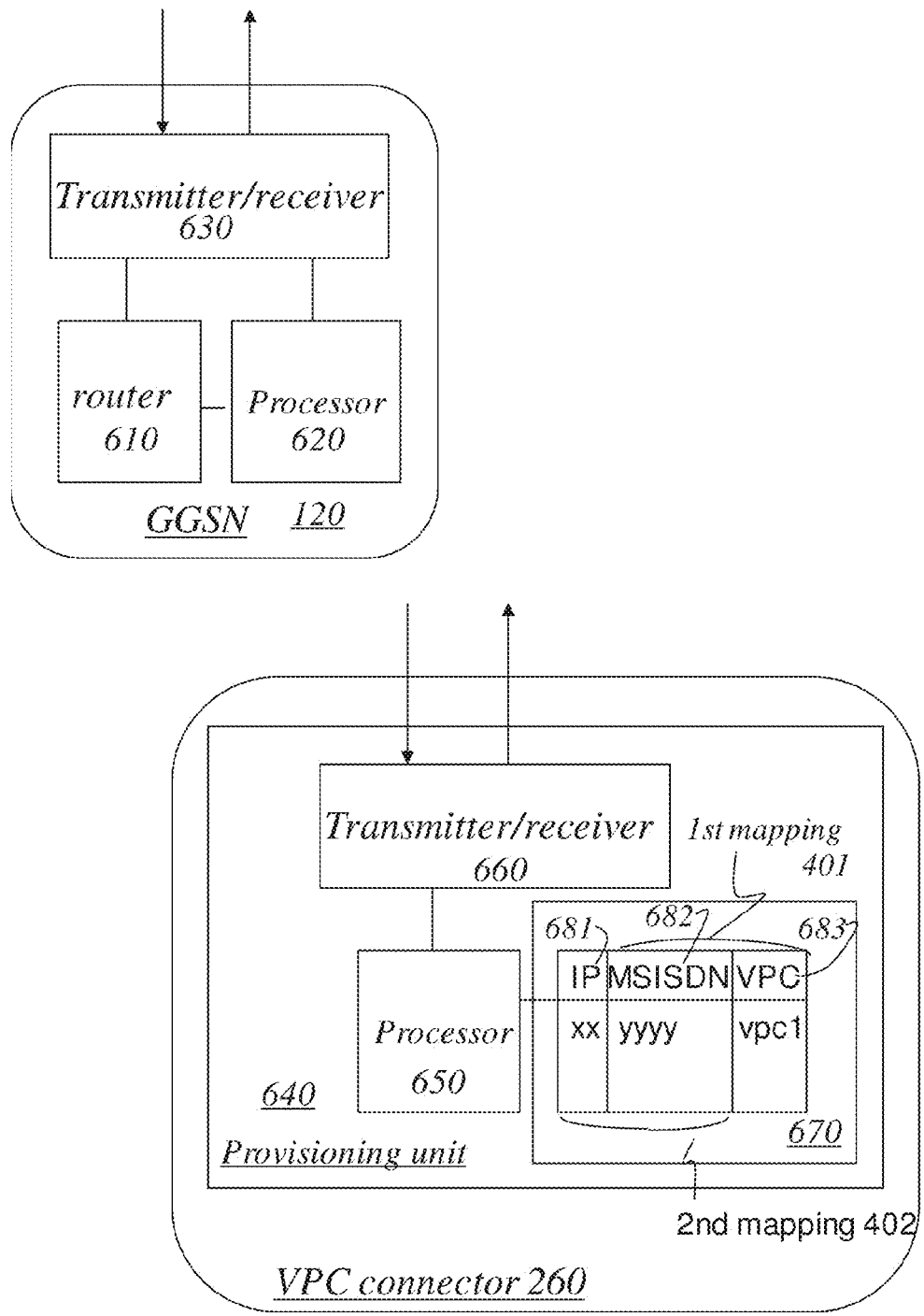
FIG. 6 illustrates a gateway and a connector node according to some embodiments.

Turning now to FIG. 6 showing a gateway and a network node referred to as VPC connector according to embodiments of the present invention.

The network node 260 is referred to as a VPC connector and the VPC connector is configured to establish a connection between a mobile device and a static destination address. The network node has access to a static first mapping 401 between a subscriber identity 682 associated with the mobile device and the static destination address 683 to which the data from the mobile device should be sent. Thus, this static first mapping may be performed by the provisioning unit 640 below, implying that the provisioning unit may be configured to perform said static first mapping. The network node 260 comprises a provisioning unit 640 configured to provide a gateway with the static destination address 683 to which the data from the mobile device should be sent. The provisioning unit 640 achieves that by using a dynamic second mapping 402 between the subscriber identity 682 associated with the mobile device and a temporary IP address 681 of the mobile device and said first mapping 401 such that the gateway can direct data to the provided static destination address.

The data is identified to be received from the temporary IP-address 681 of the mobile device.

Therefore, the provisioning unit 640 further comprises a receiver/transmitter unit 660 configured to receive a temporary IP address of the mobile device from a gateway of the network upon establishment of an initial connection between the mobile device and the network, wherein the mobile device is identifiable by the subscriber identity. The provisioning unit 640 further also a processing unit 650 configured to map the received temporary IP-address 681 with the subscriber identity 682 of the mobile device, in the dynamic second mapping 402, wherein the receiver/transmitter unit 660 is further configured to receive from the gateway a request to find the static destination address for data from the mobile device identified by the temporary IP address. The processing unit 650 is further configured to find the static destination address via the dynamic second mapping and the static first mapping, and the network node 260 further comprises a receiver/transmitter unit 660 configured to send the found static destination address 683 to the gateway.

As illustrated in FIG. 6, the network node may comprise a memory 670 for storing the static first mapping 401 and the dynamic second mapping 402.

The network node may be included in the gateway 120 which is exemplified by the GGSN.

Moreover, the gateway 120 comprises a receiver/transmitter unit 630 configured to obtain the static destination address to which the data from the mobile device should be sent. This is done by using a dynamic second mapping between the subscriber identity associated with the mobile device and a temporary IP address of the mobile device and said first mapping enabling the gateway to direct data to the provided static destination address. A processor 620 is configured to identify the data that it is received from the temporary IP-address of the mobile device. Further, the gateway 120 comprises a router 610 configured to direct the data from the mobile device to the received static destination address.

According to a further embodiment, the receiver/transmitter unit 630 is further configured to send to the network node the temporary IP address of the mobile device upon establishment of an initial connection between the mobile device and the network associated with the subscriber identity of the mobile device, to receive data from the mobile device being identifiable by the temporary IP address, and to send a request to find the static destination address for the data of the mobile device.

The gateway 120 may comprise the network node 260. Further the gateway may be a GGSN or a Public Data Network gateway in Long Term Evolution networks.

Figure 7:
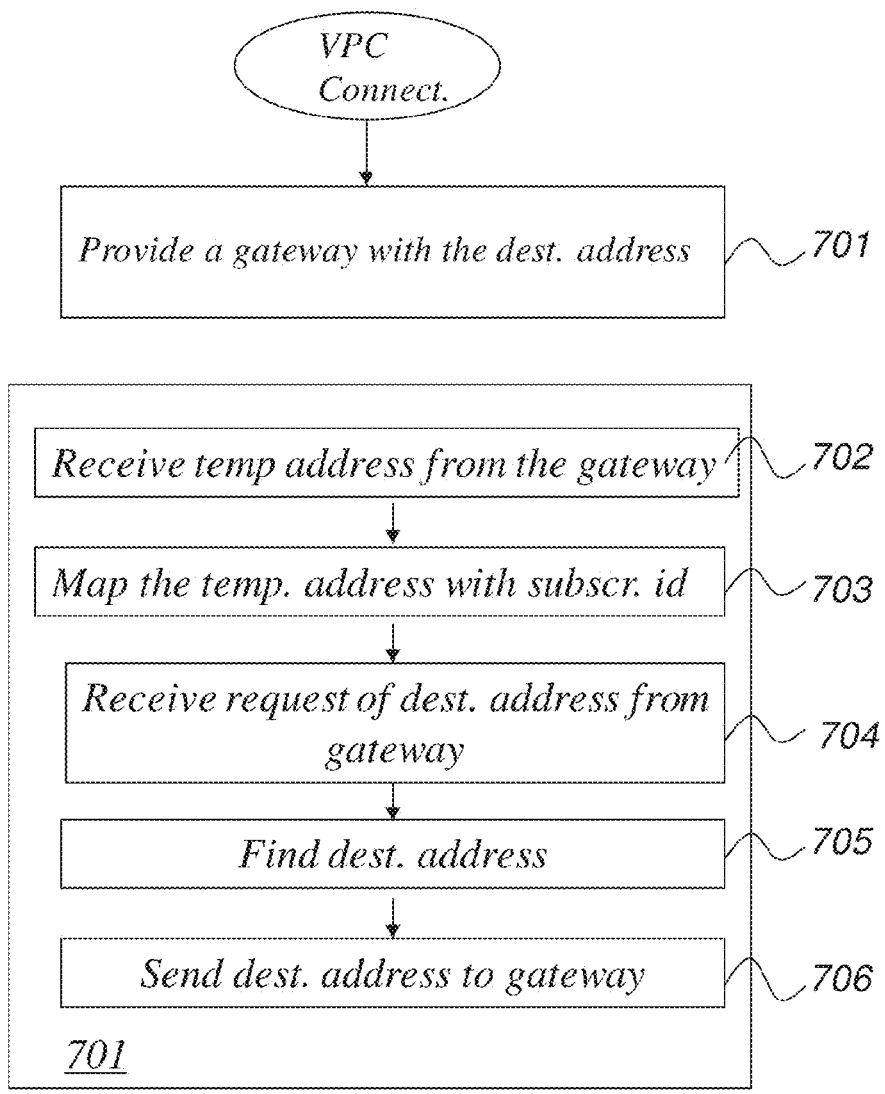
FIGS. 7-8 are flowcharts of the method according to embodiments of the present invention.
Figure 8:
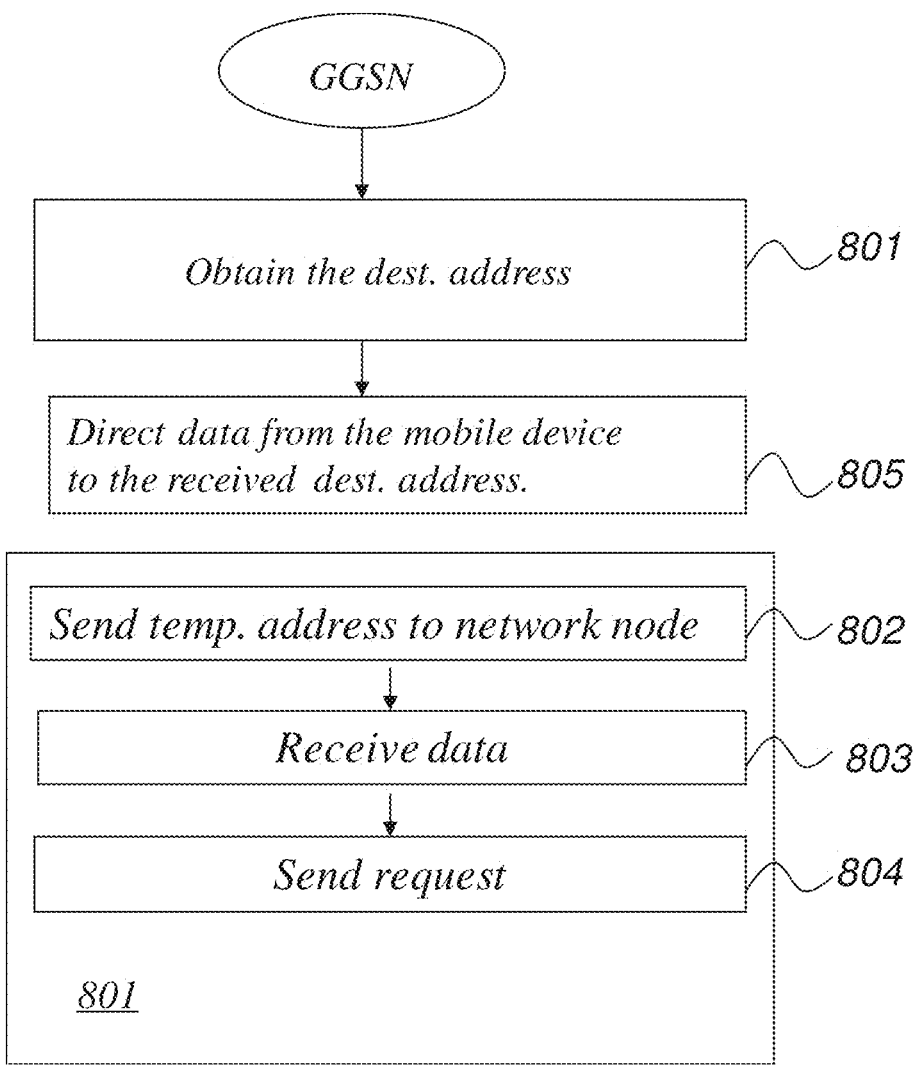

As illustrated in FIG. 7, a method in a network node of an operator network for enabling data transmission between a mobile device and a static destination address is provided in accordance with embodiments of the present invention. The network node has access to a static first mapping between a subscriber identity associated with the mobile device and the static destination address to which the data from the mobile device should be sent. In the method, a gateway is provided 701 with the static destination address to which the data from the mobile device should be sent. That is achieved by using a dynamic second mapping between the subscriber identity associated with the mobile device and a temporary IP address of the mobile device and said first mapping such that the gateway can direct data to the provided static destination address. The data is identified to be received from the temporary IP-address of the mobile device.

According to a further embodiment, the providing step further comprises receiving 702 a temporary IP address of the mobile device from a gateway of the network upon establishment of an initial connection between the mobile device and the network, wherein the mobile device is identifiable by the subscriber identity, mapping 703 the received temporary IP-address with the subscriber identity of the mobile device, in the dynamic second mapping, receiving 704 from the gateway a request to find the static destination address for data from the mobile device identified by the IP address, finding 705 the static destination address via the dynamic second mapping and the static first mapping, and sending 706 the found static destination address to the gateway.

According to a further aspect, a method in a gateway of an operator network for enabling data transmission between a mobile device and a static destination address is provided. A network node is associated with the gateway has access to a static first mapping between a subscriber identity associated with the mobile device and the static destination address to which the data from the mobile device should be sent. In the method, the static destination address to which the data from the mobile device should be sent is obtained 801 from the network node. That is achieved by using a dynamic second mapping between the subscriber identity associated with the mobile device and a temporary IP address of the mobile device and said first mapping enabling the gateway to direct data, identified to be received from the temporary IP-address of the mobile device, to the provided static destination address. Data is then directed 805 from the mobile device to the received static destination address.

According to one embodiment, the obtaining step 801 further comprises sending 802 to the network node the temporary IP address of the mobile device upon establishment of an initial connection between the mobile device and the network associated with the subscriber identity of the mobile device, receiving 803 data from the mobile device being identifiable by the temporary IP address, and sending 804 a request to find the static destination address for the data of the mobile device.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a connector node for facilitating data transmission between a wireless communication device (WCD) and a static network address for communicating with an application, the method comprising:
   obtaining first information mapping the static network address for communicating with the application to a subscription identifier for use by the WCD to obtain access to an operator network;
   receiving a first message transmitted by a gateway node, the first message comprising second information associating a dynamic network address allocated to the WCD with the subscription identifier;
   after receiving first message, mapping the static network address for communicating with the application with the dynamic network address allocated to the WCD; and
   providing to the gateway node the static network address so that the gateway node is able to forward to the application data transmitted by the WCD and received at the gateway node.

2. The method of claim 1, wherein
   the method further comprises: receiving a second message transmitted by the gateway node, the second message comprising the dynamic network address, and using the dynamic network address to retrieve the destination address, and
   the providing step is performed after and as a result of receiving the second message and retrieving the destination address.

3. The method of claim 2, wherein the step of mapping the destination address with the dynamic network address comprises storing in a data storage system a record comprising a first field in which the dynamic network address is stored and a second field in which the destination address is stored.

4. The method of claim 3, wherein using the dynamic network address included in the first message to obtain the destination address mapped with the dynamic network address comprises using the dynamic network address to retrieve destination address from the data storage system.

5. The method according to claim 1, wherein the subscription identifier is an International Mobile Subscriber Identity (IMSI) or a Mobile Subscriber Integrated Services Digital Network Number (MSISDN).

6. The method according to claim 1, wherein the static network address is a static IP address.

7. The method according to claim 6, wherein the static IP address is virtual private cloud IP address.

8. The method according to claim 1, wherein the WCD is a machine-to-machine device.

9. The method of claim 1, wherein the dynamic network address is a temporary dynamic network address allocated by the gateway to the WCD.

10. The method according to claim 1, wherein the gateway is a GPRS Gateway Support Node (GGSN) or a packet data network gateway (PDN-GW).

11. A network node, comprising:
   a processor;
   a transmitter; and
   a receiver, wherein the network node is configured to perform the method of claim 1.

12. A method performed by a gateway for facilitating data transmission between a wireless communication device (WCD) and an application server having a static network address, the method comprising:
   the gateway receiving a first message transmitted by the WCD, the first message comprising a subscription identifier for use in accessing an operator network;
   after receiving the first message, the gateway allocating a dynamic network address to the WCD;
   the gateway receiving a second message transmitted by the WCD, the second message comprising the dynamic network address and application data intended for the application server at the static network address;
   in response to receiving the second message comprising the dynamic network address allocated to the WCD and the application data, the gateway using the dynamic network address allocated to the WCD to look-up the static network address of the application server; and
   after looking-up the static network address using the dynamic network address allocated to the WCD, the gateway transmitting a third message to the static network address, the third message comprising the application data.

13. The method of claim 12, wherein the step of using the dynamic network address allocated to the WCD to look-up the static network address consists of the gateway transmitting a request to a network node that has access to mapping information mapping the dynamic network address allocated to the WCD with the static network address and the gateway receiving a response from the network node, wherein the response comprises the static network address.

14. The method of claim 13, further comprising the gateway transmitting fourth message to the network node after receiving the first message and before transmitting the request, wherein the fourth message comprises the subscription identifier and the dynamic network address allocated to the WCD, thereby enabling the network node to map the static network address with the dynamic network address.

15. A method for facilitating data transmission between a wireless communication device (WCD) and a static network address for communicating with an application, the method comprising:
   storing in a data storage system first mapping information mapping the static network address with a subscription identifier for use by the WCD to access a wireless network;
   after storing the first mapping information, receiving a first message comprising the subscription identifier;
   after receiving the first message, allocating a dynamic network address to the WCD;
   after allocating the dynamic network address to the WCD, mapping the static network address to the dynamic network address using the subscription identifier and the first mapping information;
   receiving a second message comprising the dynamic network address and application data;
   in response to receiving the second message comprising the dynamic network address, using the dynamic network address included in the second message to obtain the static network address mapped with the dynamic network address; and
   after obtaining the static network address mapped with the dynamic network address, transmitting a third message to the static network address, the third message comprising the application data.

16. A network node, comprising:
a processor;
a transmitter; and
a receiver, wherein
the network node is configured to perform the method of claim 12.

17. The method of claim 15, wherein
the dynamic network address is a temporary network address allocated by a gateway to the WCD, and
the gateway receives the first message and the second message and transmits the third message to the static network address.

18. The method according to claim 17, wherein the gateway is a GPRS Gateway Support Node (GGSN) or a packet data network gateway (PDN-GW).

19. The method of claim 15, wherein the step of mapping the static network address with the dynamic network address comprises storing in the data storage system a record comprising a first field in which the dynamic network address is stored and a second field in which the static network address is stored.

20. The method of claim 19, wherein using the dynamic network address included in the first message to obtain the static network address mapped with the dynamic network address comprises using the dynamic network address to retrieve the static network address from the data storage system.

21. The method of claim 15, wherein the step of using the dynamic network address included in the message to obtain the static network address mapped with the dynamic network address is performed by a gateway node and comprises the gateway node sending to a connector node a request for the static network address, said request comprising the dynamic network address.

22. The method of claim 21, wherein the connector node performs the step of mapping the static network address to the dynamic network address.

23. A network node, comprising:
a processor;
a transmitter; and
a receiver, wherein
the network node is configured to perform the method of claim 15.

* * * * *